April 23, 1957  D. ZURIT  2,789,654
APPARATUS FOR FILTERING AIR OR GAS THAT ENTERS BEER KEGS
Filed June 7, 1954
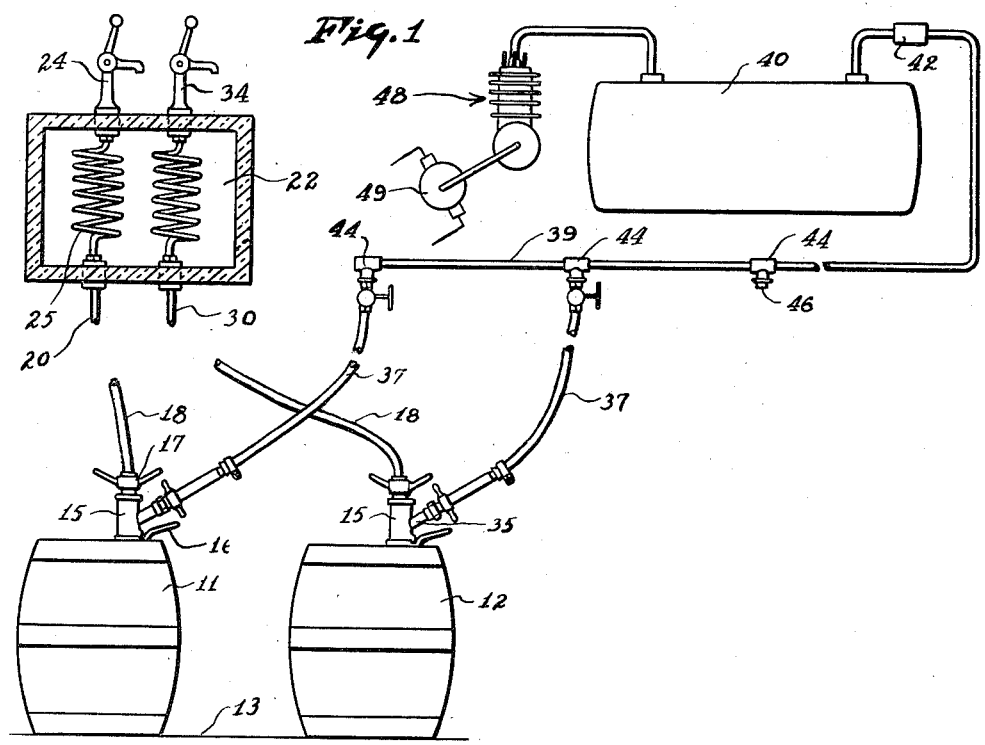
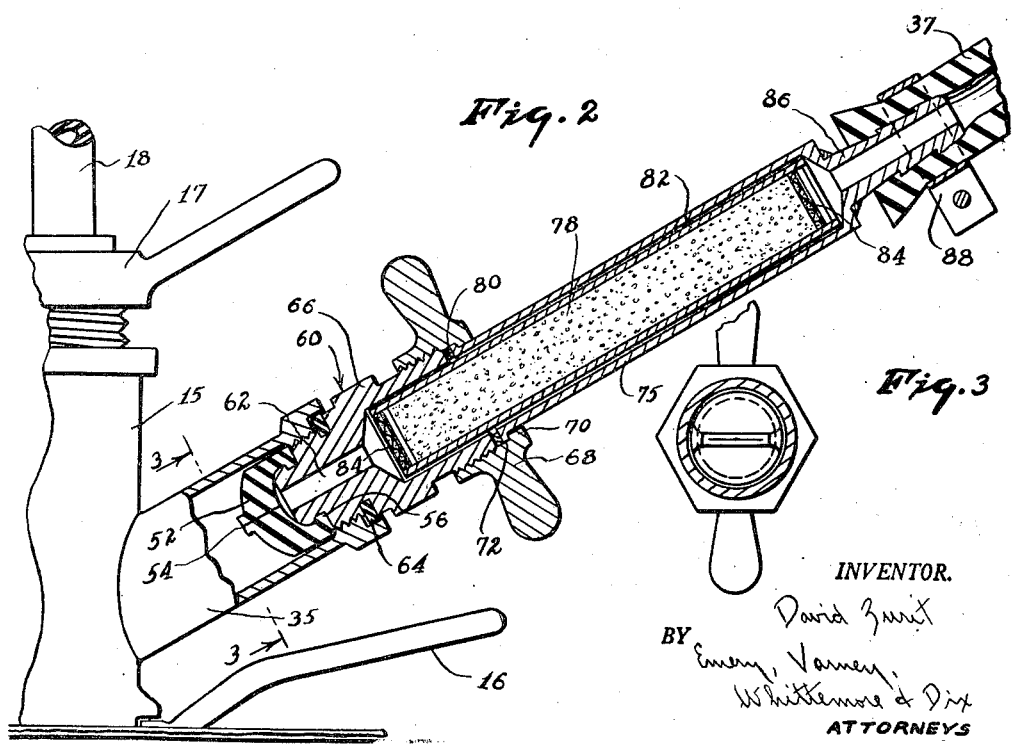
INVENTOR.
David Zurit
BY Emery, Varney,
Whittemore & Dix
ATTORNEYS

United States Patent Office 2,789,654
Patented Apr. 23, 1957

2,789,654

APPARATUS FOR FILTERING AIR OR GAS THAT ENTERS BEER KEGS

David Zurit, Teaneck, N. J.

Application June 7, 1954, Serial No. 434,690

5 Claims. (Cl. 183—4.8)

This invention relates to apparatus for filtering the air or compressed gas supplied to a beer keg, and the invention relates more particularly to a construction in which a separate filter, with a replaceable filter cartridge, is connected with each individual beer keg from which draft beer is drawn.

In establishments which serve draft beer, it is the usual practice to supply compressed air or carbon dioxide to the beer keg to maintain a pressure on the beer so that as beer is drawn from the keg, that remaining in the keg will not become flat. If the compressed gas supplied to the keg is contaminated with vapors having an odor, this odor is often absorbed by the beer and the taste of the beer is adversely affected.

It is common practice in beer taverns to supply compressed air to a tank from which piping extends to the various kegs upon which air pressure is to be maintained. A filter is often used in the air line from the tank, principally for the purpose of removing any oil particles or odor which may be in the air from the compressor.

Such a filter located in a position to filter the air before it flows into the header, from which the individual hoses connected with the beer kegs, has a number of disadvantages. One is that the contamination to the air sometimes occurs in the hose from the header to the beer keg. For example, if the Thomas valve for any particular beer keg is defective, beer may be driven back into the air line when the keg is initially tapped, and even though the beer is driven out of the line by the compressed air, the inside of the hose is wet with beer. This beer spoils and sets up a contamination in the line after a period of time.

Another problem met with in filtering the air to beer kegs is that the filter is not always properly maintained and cleaned; and after a period of service it no longer serves effectively for removing odors from the air tank.

It is an object of this invention to provide improved means for filtering the gas or air which is supplied to a beer keg for maintaining a pressure on the beer. More particularly, it is an object of the invention to provide individual filters for each beer keg in an establishment where a number of different kegs are connected with the lines from which the beer is dispensed.

Another object of the invention is to provide a filter which connects with the conventional tapping equipment for a beer keg, between the tapping equipment and the hose through which compressed air is supplied to the tapping equipment. In this way odors from any contamination in the air hose, as well as from contamination at other sources further from the keg, are eliminated by the filter.

One feature of the invention relates to a construction in which the filter has an inexpensive cartridge element containing the filtering material, and which can be replaced conveniently so that the filter can always be kept in good condition. An important advantage in having a replaceable filter cartridge for each keg is that breweries that supply beer to the tavern can replace the filters on the lines to which their beer kegs are connected and thus assure pure air for their own kegs and proper taste for the beer drawn from those kegs.

In some places the breweries are forbidden by State law to give any equipment to customers, but in taverns where the filter of this invention is used on the air lines, the brewery can replace filter cartridges as a matter of maintenance of the lines which are used with their kegs. The preferred embodiment of the invention connects the filter with the tapping equipment by means of a wing nut which can be removed without the aid of wrenches so that the replacement of a filter can be made quickly and conveniently.

Other objects, features and advantages of the invention will appear or be pointed out as the description proceeds.

In the drawing, forming a part hereof, in which like reference characters indicate corresponding parts in all the views;

Figure 1 is a diagrammatic view showing two beer kegs connected with lines through which beer is dispensed, and connected with a compressed air header supplied with air from a tank and a compressor;

Figure 2 is a greatly enlarged view, mostly in section, showing a filter made in accordance with this invention and connected to conventional tapping equipment on a beer keg; and Figure 3 is a sectional view taken on the line 3—3 of Figure 2.

Figure 1 shows two beer kegs 11 and 12 which rest on a floor 13 in a refrigerated room where the kegs are kept. The keg 11 has standard tapping equipment which includes a main fitting 15 from which a beer rod extends downwardly into the keg. This fitting 15 is secured to the keg by clamping means operated by a handle 16. At the upper end of the main fitting 15 there is a wing nut 17 which operates a clamp for securing a hose 18 to the tapping equipment.

This hose 18 connects with a beer line 20 which extends through a cooler 22 to a tap 24 located on a bar. The beer line 20 includes a coil 25 through which the beer passes in the cooler 22. The tapping equipment for the keg 12 is similar to that already described for the keg 11 and it has a hose 18 which connects with a beer line 30 leading to a tap 34 on the bar.

The equipment thus far described is conventional and may be modified in various ways, it being understood that it is merely representative of a beer dispensing equipment in which separate beer taps on a bar are connected with separate kegs. One well known and conventional modification is that in which the beer kegs are located in the cooler and no coils 25 are necessary.

Each of the fittings 15 has a branch 35 to which an air hose 37 is connected. The various hoses 37 for the different kegs are supplied from a common compressed air header 39 connected at one end to a tank 40. A pressure regulator 42 is connected in the air line leading to the header 39.

There are two fittings 44 connecting the kegs 11 and 12 to the header 39. Another fitting 44 is closed by a plug 46 and there may be various other additional fittings 44 along the header so that different numbers of kegs can be connected with the air supply header 39 depending upon the number of taps at the bar. Those illustrated are merely representative of a plurality of taps for dispensing beer.

Compressed air is supplied to the tank 40 by a compressor 48 driven by an electric motor 49. The compressor shown is of the piston type, but diaphragm compressors are commonly used and it will be understood that the compressor 48 is merely representative of means for supplying compressed air or gas to the kegs 11 and 12. In some taverns a cylinder of compressed carbon dioxide is connected to the beer kegs instead of air, and the danger of contaminating odors from the carbon dioxide tank are much less than when compressed air is used. Even with compressed gas from a cylinder, however, there is danger of contamination from the hoses 37, particularly when a Thomas valve becomes defective and beer is driven back into the air or gas hoses. One advantage in the use of compressed air instead of gas from cylinders is the lower cost of compressed air.

With conventional tapping equipment, the air hose 37 is connected to the branch 35 by a fitting which extends into the branch 35 for holding a check valve 52 in the branch. The purpose of this check valve is to prevent beer from flowing upwardly into the air line when the keg is initially tapped.

The particular check valve 52 shown in Figures 2 and 3 of the drawing has a rubber valve element, commonly referred to as a "Thomas valve," and it has a slit 54 extending through a front wall of the rubber valve element with the rubber faces on opposite sides of the slit in contact with one another when the valve is not distorted by the application of pressure to its concave inner face. The Thomas valve 54 has an inwardly extending flange 56 which fits into an under cut slot in an adapter 60. This secures the Thomas valve 52 to the end of the adapter with the slit 54 in line with an opening 62 through the adapter.

When air or liquid pressure is applied to the front, convex face of the valve 52, this pressure merely urges the confronting faces of the slit 54 into firmer contact with one another so that no fluid can pass through the valve. When the pressure is applied from the other side, however, that is, against the inner concave face of the valve 52, the confronting faces of the slit 54 are pressed away from one another so that compressed air or gas can flow through the valve 52 in the direction of the beer keg.

The adapter 60 threads into the end of the branch 35 of the main fitting 15, and it has a shoulder which clamps a gasket 64 against the bottom of a counter bore located at the outer end of the threads in the branch 35. The adapter 60 has flat faces 66 for receiving a wrench so that the adapter can be screwed into the branch 35 to clamp the gasket 64 tightly against the bottom of the counterbore for preventing any possible leakage. At the upper end of the adapter 60 there are other threads for receiving a wing nut 68 having an inwardly extending flange 70 which extends over a flange 72 of a housing 75.

Beyond the passage 62, the adapter 60 is of larger inside diameter equal to the inside diameter of the housing 75, and the wing nut 68 holds the housing 75 with its axis in line with the longitudinal axes of the opening through the adapter 60 so that the enlarged opening in the adapter 60 forms a continuation of the housing 75 for receiving a filter cartridge 78. This cartridge fits loosely in the housing 75 so that it can be easily removed when the housing is disconnected from the adapter 60. The loose fit has the additional advantage of making wider manufacturing tolerances permissible for the filter cartridge 78.

In order to prevent leakage of air through the clearance between the cartridge 78 and the walls of the housing 75, there is a gasket, preferably a rubber ring 80, clamped between the flange 72 and the end face of the adapter 60. This ring is soft enough so that it is distorted into contact with the side of the cartridge 78 when the wing nut 68 is tightened to clamp the housing 75 to the adapter 60.

The filter cartridge 78 consists of a cylindrical sleeve 82, preferably a plastic sleeve, with perforate end walls, preferably with screens 84 extending across both of the open ends of the tube 82. These screens 84 are held in place by friction, and by turning in the ends of the tube 82, if desired. The space between the screens 84 is filled with filtering material.

In the preferred embodiment of the invention, the filtering material consists of granules of activated carbon, and this material is particularly effective for moving vapors and odors from air. Polyethylene tubing has been used for the tube 82 of the filter cartridge, but other materials can be used such as plastic tubing, treated paper and rubber. The filter element 78 is preferably constructed so that it is not injuriously affected if beer leaks back through a defective check valve 52 and into the filter 78 when the keg is initially tapped and there is no substantial pressure in the hose 37. At the upper end of the housing 75 there is a hose fitting 86 to which the hose 37 is secured by a clamp 88.

In practice a filter element 78 is used for successive kegs of beer depending upon the condition of the air passing through the filter and then the wing nut 68 is removed so that the housing 75 can be pulled away from the adapter 60; and the old filter element 78 is removed and replaced with a fresh one. When the renewable cartridges 78 are supplied by the brewery, the replacement is made by the man who delivers the beer kegs to the tavern after he has supplied a certain number of kegs of beer. Although the time between replacements of the filter 78 may be widely different at different seasons of the year because of the variation in the demand for beer, the important consideration is that the replacement be made in accordance with the number of beer kegs that have been emptied because the amount of air which has flowed through the cartridge 78 is proportional to the number of beer kegs to which air has been supplied.

The preferred embodiment of the invention has been illustrated and described but changes and modifications can be made and some features can be used without others without departing from the invention as defined in the claims.

What is claimed is:

1. An air or gas filter for use with tapping equipment that has a fitting with one branch through which liquid flows from a keg and a second branch through which compressed gas is supplied to the keg, the second branch having an end portion for receiving a fitting for a compressed gas line, said filter including an adapter that connects with the fitting in place of the gas line fitting, a sleeve that fits against the adapter and that forms with the adapter an enclosed chamber, detachable fastening means that connect the sleeve to the adapter, a fitting at the upper end of the housing for connection to the compressed gas line, and a filter capsule that fits within the chamber and that is inserted into the sleeve when the sleeve is disconnected from the adapter by release of said detachable fastening means.

2. The combination with tapping equipment for a beer keg of an adapter connected to a branch outlet of the tapping equipment through which compressed gas is supplied to the interior of the keg, a check valve carried by the adapter and oriented to prevent back flow of fluid through the compressed gas line in a direction away from the keg, the adapter having a longitudinal passage therethrough with an enlarged upstream end that forms an open ended chamber, a housing that fits against the adapter and that has an open lower end confronting the open upper end of the adapter to form with the adapter an enclosed chamber, detachable fastening means securing the housing to the adapter, a hose fitting at the upstream end of the housing, a filter capsule enclosed within the chamber for filtering gas which passes through the chamber, and packing in the chamber and extending from the inside wall of the chamber into contact with the outside of the filter capsule to prevent the passage of air between the filter capsule and the inside wall of the chamber in which the capsule is enclosed.

3. A gas filter for use with tapping equipment which extends into a beer keg and which has a fitting at its upper end above the beer keg with a branch for connection to a compressed gas line, an adapter connected to the branch, a check valve on the adapter for preventing back flow of fluid through the adapter in a direction away from the keg, said check valve comprising a split rubber element which closes in response to pressure from the keg side of the element and which opens in response to pressure from its upstream side, a gasket compressed between the adapter and the branch fitting for preventing leakage of compressed gas between the adapter and the branch fitting when the adapter is connected to said branch fitting as a semi-permanent connection, the adapter having a longitudinal passage therethrough which is enlarged at its upstream end to form one end of a chamber, a housing having a flange at its downstream end which fits against an end face of the adapter, said housing having an inside cross section equal to that of the enlarged opening through the adapter and forming with said enlarged opening an enclosed chamber, detachable fastening means connecting the housing to the adapter, a hose fitting integral with the housing and located at the upstream end of the housing, a filter capsule located within the chamber and packing clamped between the flange of the housing and the confronting face of the adapter and displaced by pressure between said flange and face into contact with the outside of the capsule to prevent the passage of air through the housing around the outside of the capsule.

4. A gas filter for use on a compressed gas supply branch of a beer keg tapping fitting through which beer flows to a distributing system, an adapter for connecting with said branch in place of a usual hose connection, a sleeve having a flange at one end which fits against an end face of the adapter, detachable fastening means for clamping the flange against the adapter, a hose fitting at the end of the sleeve remote from the flange for connection with a hose through which compressed gas is supplied to the sleeve, and a filter capsule fitting within the sleeve and comprising a tube having perforate end walls and having granules of activated carbon enclosed in the space between the perforate end walls.

5. A gas filter for use with a fitting on a beer keg and through which compressed gas flows into the keg, an adapter for connecting with the fitting, a housing having a flange at one end which fits against the adapter, detachable fastening means for clamping the flange against the adapter, a hose fitting at the end of the housing remote from the flange for connection with a hose through which compressed gas is supplied to the housing, and a filter capsule within the housing comprising a tube having perforate end walls and having granules of activated carbon enclosed in the space between the screens, and in which there is packing clamped between the flange of the housing and the confronting end face of the adapter, the packing being displaced inwardly by pressure between said flange and end face and into contact with the outside wall of the filter capsule tube so as to prevent the passage of air through the housing between the outside of the tube and the inside surface of the housing.

References Cited in the file of this patent

UNITED STATES PATENTS

| | | |
|---|---|---|
| 188,658 | Newton | Mar. 20, 1877 |
| 1,278,651 | Heymann | Sept. 10, 1918 |
| 1,950,502 | Madan | Mar. 13, 1934 |
| 2,348,831 | Mathis | May 16, 1944 |
| 2,367,077 | Ward | Jan. 9, 1945 |
| 2,479,058 | Botting | Aug. 16, 1949 |

FOREIGN PATENTS

| | | |
|---|---|---|
| 553,313 | Great Britain | May 17, 1943 |